United States Patent
Yokokawa et al.

(10) Patent No.: US 7,016,581 B2
(45) Date of Patent: Mar. 21, 2006

(54) DISPERSION COMPENSATION UNIT AND OPTICAL COMMUNICATION SYSTEM

(75) Inventors: Tomoyuki Yokokawa, Yokohama (JP); Masashi Onishi, Yokohama (JP); Takashi Fujii, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 146 days.

(21) Appl. No.: 10/428,779

(22) Filed: May 5, 2003

(65) Prior Publication Data

US 2003/0215200 A1 Nov. 20, 2003

Related U.S. Application Data

(60) Provisional application No. 60/393,122, filed on Jul. 3, 2002.

(30) Foreign Application Priority Data

May 17, 2002 (JP) .......................... P2002-143153

(51) Int. Cl.
*G02B 6/02* (2006.01)
*H04J 14/02* (2006.01)

(52) U.S. Cl. .................. 385/123; 385/124; 385/127; 398/81

(58) Field of Classification Search ........ 385/123–138; 398/81
See application file for complete search history.

(56) References Cited

U.S. PATENT DOCUMENTS

| | | | |
|---|---|---|---|
| 5,821,510 A * | 10/1998 | Cohen et al. ............... 235/375 |
| 6,421,484 B1 * | 7/2002 | Tanaka et al. .............. 385/100 |
| 6,477,306 B1 | 11/2002 | Kato et al. | |
| 6,519,402 B1 * | 2/2003 | Aikawa et al. ............. 385/124 |
| RE38,086 E * | 4/2003 | Onishi et al. .............. 385/123 |
| 6,633,715 B1 * | 10/2003 | Knudsen et al. ............ 385/127 |
| 6,701,051 B1 * | 3/2004 | Mukasa ...................... 385/123 |
| 6,829,422 B1 * | 12/2004 | Berkey et al. ............. 385/126 |
| 2001/0051031 A1 | 12/2001 | Hada et al. | |
| 2002/0114597 A1 | 8/2002 | Brimacombe et al. | |
| 2003/0118307 A1 | 6/2003 | Gruner-Nielsen et al. | |

FOREIGN PATENT DOCUMENTS

| | | |
|---|---|---|
| EP | 0 472 944 A1 | 3/1992 |
| EP | 0 724 171 A2 | 7/1996 |
| EP | 1 063 542 A1 | 12/2000 |
| JP | 2001-296444 | 10/2001 |
| JP | 2001-337245 | 12/2001 |

OTHER PUBLICATIONS

A. H. Gnauck et al., "Dispersion and dispersion-slope compensation of NZ DS F over the entire C band using higher-order-mode fiber", Electronics Letters, vol. #36, #23, Nov. 9, 2000, pp 1946-1947.

* cited by examiner

Primary Examiner—John D. Lee
Assistant Examiner—Tina M Wong
(74) Attorney, Agent, or Firm—McDermott Will & Emery LLP

(57) ABSTRACT

The present invention relates to a dispersion compensation unit capable of compensating for both the chromatic dispersion and dispersion slope of a non-zero dispersion-shifted optical fiber. The dispersion compensation unit is formed by winding a first optical fiber and second optical fiber into coil shapes and storing them in a case. The first optical fiber has a negative chromatic dispersion $D_1$ and a negative dispersion slope $S_1$ at a wave length in use. The second optical fiber has a positive chromatic dispersion $D_2$ and a positive dispersion slope $S_2$ at the wavelength in use.

29 Claims, 10 Drawing Sheets

Fig.10

| | NON-ZERO DISPERSION-SHIFTED OPTICAL FIBER | FIRST OPTICAL FIBER | SECOND OPTICAL FIBER | DISPERSION COMPENSATION UNIT |
|---|---|---|---|---|
| LENGTH (km) | 100 | 9.7 | 21.9 | 31.6 |
| CHROMATIC DISPERSION D (ps/nm/km) | 4 | −80 | 17 | −13 |
| DISPERSION SLOPE S (ps/nm2/km) | 0.08 | −0.96 | 0.058 | −0.25 |
| RATIO (S/D) (/nm) | 0.020 | 0.012 | 0.003 | 0.020 |
| LOSS (dB/km) | 0.21 | 0.35 | 0.20 | 0.27 |
| FOM (ps/nm/dB) | | 229 | −85 | 47 |

DISPERSION COMPENSATION UNIT AND OPTICAL COMMUNICATION SYSTEM

CROSS-REFERENCE TO RELATED APPLICATION

This application claims priority to Provisional Application Ser. No. 60/393,122 filed on Jul. 3, 2002, which is hereby incorporated by reference in its entirety.

BACKGROUND OF THE INVENTION

1. Field of the Invention

The present invention relates to a dispersion compensation unit which compensates for both the chromatic dispersion and dispersion slope of an optical fiber transmission line and an optical communication system including the optical fiber transmission line and dispersion compensation unit.

2. Related Background Art

To increase the speed and capacity of optical communication in an optical communication system for executing WDM (Wavelength Division Multiplexing) optical transmission, it is important to make the absolute value of accumulated chromatic dispersion in the optical transmission line in a wide signal wavelength band as small as possible. It is generally difficult in an optical transmission line using only a kind of optical fiber. Hence, the absolute value of accumulated chromatic dispersion in an optical transmission line in a wide band is reduced due to an optical transmission line formed by connecting a plurality of kinds of optical fibers.

For example, a dispersion compensation optical fiber disclosed in Japanese Patent Laid-Open No. 2001-337245 aims at compensating for both the chromatic dispersion and dispersion slope of a standard single-mode optical fiber having a zero dispersion wavelength near 1.3 μm and a positive chromatic dispersion (about 17 ps/nm/km) at 1.55 μm. The chromatic dispersion is −40 to −10 ps/nm/km at a wavelength in use within a wavelength band of 1.53 to 1.62 μm. In an optical transmission line formed by connecting the single-mode optical fiber and dispersion compensation optical fiber, when the length ratio of these fibers is appropriately set, the absolute value of the entire chromatic dispersion becomes small. In addition, the absolute value of the entire dispersion slope also becomes small.

SUMMARY OF THE INVENTION

The inventors have studied conventional optical communication systems in detail and, and as a result, have found problems as follows.

As an optical transmission line installed in a relay zone, a non-zero dispersion-shifted optical fiber is sometimes used in place of a single-mode optical fiber. A non-zero dispersion-shifted optical fiber has a zero dispersion wavelength at a wavelength longer than 1.3 μm and a small positive chromatic dispersion (several ps/nm/km) at 1.55 μm. It is also required to compensate for both the chromatic dispersion and dispersion slope of such a non-zero dispersion-shifted optical fiber.

To cause a dispersion compensation optical fiber to compensate for both the chromatic dispersion and dispersion slope of a non-zero dispersion-shifted optical fiber, the value of a ratio $(S_1/D_1)$ of a dispersion slope $S_1$ to a chromatic dispersion $D_1$ of the dispersion compensation optical fiber must almost equal the value of a ratio $(S_0/D_0)$ of a dispersion slope $S_0$ to a chromatic dispersion $D_0$ of the non-zero dispersion-shifted optical fiber. When the values of the ratios $(S_1/D_1)$ and $(S_0/D_0)$ almost equal, an optical transmission line in which the non-zero dispersion-shifted optical fiber and dispersion compensation optical fiber are connected can decrease the absolute value of the entire chromatic dispersion and also the absolute value of the entire dispersion slope by appropriately setting the length ratio of the fibers.

However, although a non-zero dispersion-shifted optical fiber whose value of the ratio $(S_0/D_0)$ exceeds 0.015/nm is surely present, it is technically difficult to implement a dispersion compensation optical fiber having a ratio $(S_1/D_1)$ more than 0.015/nm. That is, it is hard to compensate for both the chromatic dispersion and dispersion slope of such a non-zero dispersion-shifted optical fiber by using only a dispersion compensation optical fiber having a negative chromatic dispersion and a negative dispersion slope at a signal wavelength band.

Additionally, in an optical transmission line constituted by such a non-zero dispersion-shifted optical fiber and dispersion compensation optical fiber connected to each other, both the absolute value of the entire chromatic dispersion and that of the entire dispersion slope cannot be sufficiently reduced. Hence, there is a limit to further increase the capacity of an optical communication system including such an optical transmission line.

The present invention has been made to solve the above problem, and has as its object to provide a dispersion compensation unit capable of compensating for both the chromatic dispersion and dispersion slope of a non-zero dispersion-shifted optical fiber having a high ratio $(S_0/D_0)$ and an optical communication system including the dispersion compensation unit and capable of increasing the capacity.

A dispersion compensation unit according to the present invention comprises a first optical fiber and a second optical fiber optically connected to the first optical fiber. The first optical fiber has a negative chromatic dispersion $D_1$ and a negative dispersion slope $S_1$ at a wavelength in use. The second optical fiber has a positive chromatic dispersion $D_2$ and a positive dispersion slope $S_2$ at the wavelength in use. Letting $L_1$ be the length of the first optical fiber and $L_2$ be the length of the second optical fiber, a ratio R of a dispersion slope $S_{total}$ to a chromatic dispersion $D_{total}$ of the entire dispersion compensation unit is defined by "$R=S_{total}/D_{total}=(S_1L_1+S_2L_2)/(D_1L_1+D_2L_2)$". When the lengths $L_1$ and $L_2$ of the optical fibers are appropriately set, the value of the ratio R of this dispersion compensation unit can be increased. Hence, this dispersion compensation unit can compensate for both the chromatic dispersion and dispersion slope of a non-zero dispersion-shifted optical fiber whose value of the ratio (dispersion slope $S_0$/chromatic dispersion $D_0$) is large.

In the dispersion compensation unit according to the present invention, preferably, the chromatic dispersion $D_1$ of the first optical fiber is −40 ps/nm/km or less, and a ratio $(S_1/D_1)$ of the dispersion slope $S_1$ to the chromatic dispersion $D_1$ of the first optical fiber is 0.005/nm or more. In this case, the first optical fiber can be shortened, and the dispersion compensation unit can be made compact.

In the dispersion compensation unit according to the present invention, preferably, the chromatic dispersion $D_1$ of the first optical fiber is −150 ps/nm/km or more, and a ratio $(S_1/D_1)$ of the dispersion slope $S_1$ to the chromatic dispersion $D_1$ of the first optical fiber is 0.020/nm or less. In this case, any increase in bending loss or polarization mode dispersion of the first optical fiber can be suppressed.

In the dispersion compensation unit according to the present invention, preferably, the chromatic dispersion $D_2$ of the second optical fiber is 15 ps/nm/km or more but 25 ps/nm/km or less, and a ratio $(S_2/D_2)$ of the dispersion slope $S_2$ to the chromatic dispersion $D_2$ of the second optical fiber is 0.001/nm or more but 0.01/nm or less. In this case, the second optical fiber can be shortened, and the dispersion compensation unit can be made compact.

The dispersion compensation unit according to the present invention, letting $L_1$ be a length of the first optical fiber and $L_2$ be a length of the second optical fiber, a ratio R defined by "$R=(S_1L_1+S_2L_2)/(D_1L_1+D_2L_2)$" is preferably 0.005/nm or more. The ratio R is more preferably 0.005/nm or more but 0.030/nm or less. In this case, the dispersion compensation unit can appropriately compensate for both the chromatic dispersion and dispersion slope of a non-zero dispersion-shifted optical fiber.

In the dispersion compensation unit according to the present invention, the first optical fiber and second optical fiber are preferably wound into coil shapes and stored in one case. In this case, the dispersion compensation unit can easily be handled. Note that the first optical fiber and second optical fiber may be wound on a bobbin or wound without using a bobbin.

In the dispersion compensation unit according to the present invention, preferably, of the first optical fiber and second optical fiber, a space between an inner surface of the case and only the first optical fiber is filled with a resin. In this case, any increase in micro-bending loss of the first optical fiber, in which the micro-bending loss relatively easily increases, can be suppressed.

In the dispersion compensation unit according to the present invention, a space between an inner surface of the case and both of the first optical fiber and second optical fiber is preferably filled with a resin. In this case, any increase in micro-bending loss of each of the first optical fiber and second optical fiber can be suppressed. In addition, the structure of the dispersion compensation unit can be simplified.

In the dispersion compensation unit according to the present invention, the first optical fiber and second optical fiber are preferably fusion-spliced. A fusion-spliced loss is preferably 0.5 dB or less. In this case, the insertion loss of the dispersion compensation unit is small, and the system margin of an optical communication system including the dispersion compensation unit can be made large.

In the dispersion compensation unit according to the present invention, preferably, a fusion-spliced portion between the first and second optical fibers is re-coated with a resin, and its re-coating diameter equals that of a remaining coating portion. In this case, when the first optical fiber and second optical fiber are wound into coil shapes, the side pressure applied to a portion in contact with the fusion-spliced portion is low, and the loss becomes small.

In the dispersion compensation unit according to the present invention, the first optical fiber and second optical fiber are preferably wound on one bobbin. In this case, since only one bobbin suffices, it can easily be stored and handled, and the cost becomes low.

In the dispersion compensation unit according to the present invention, a fusion-spliced portion is preferably fixed to a flange portion of the bobbin. In this case, the fusion-spliced portion is protected. In addition, the influence of the fusion-spliced portion on the optical fibers is reduced, the quality and reliability of the dispersion compensation unit are ensured.

In the dispersion compensation unit according to the present invention, the first optical fiber is preferably wound into a coil shape outside the second optical fiber wound into a coil shape. In this case, since the bending diameter of the first optical fiber which is relatively poor in bendability can be increased, any increase in bending loss of the first optical fiber can be suppressed, the insertion loss of the dispersion compensation unit can be decreased, and the dispersion compensation unit can be made compact.

In the dispersion compensation unit according to the present invention, the first optical fiber and second optical fiber which are wound into coil shapes are preferably stacked along an axial direction. In this case, the bending diameter of the first optical fiber which is relatively poor in bendability can almost equal that of the second optical fiber. Hence, any increase in bending loss of the first optical fiber can be suppressed, and the insertion loss of the dispersion compensation unit can be decreased.

In the dispersion compensation unit according to the present invention, preferably, at the wavelength in use, an entire chromatic dispersion is −100 ps/nm/km or more but 0 ps/nm/km or less, an entire dispersion slope is −2.0 ps/nm$^2$/km or more but 0 ps/nm$^2$/km or less, an entire FOM (=absolute value of chromatic dispersion/insertion loss) is 10 ps/nm/dB or more but 200 ps/nm/dB or less. In this case, the dispersion compensation unit can compensate for the chromatic dispersion and dispersion slope of any kind of non-zero dispersion-shifted optical fiber.

In the dispersion compensation unit according to the present invention, at the wavelength in use, an entire polarization mode dispersion is preferably 0.5 ps or less. In this case, the dispersion compensation unit can be used for high-speed communication at a bit rate of 40 Gbps.

In the dispersion compensation unit according to the present invention, the second optical fiber preferably has a coating with an outer diameter of 125 $\mu$m or more but 250 $\mu$m or less. In this case, the reliability and storability of the second optical fiber are high.

In the dispersion compensation unit according to the present invention, a most outer diameter of an glass portion of the second optical fiber is preferably 80 $\mu$m or more but 150 $\mu$m or less. In this case, the fusion-spliced property and storability of the second optical fiber are excellent.

In the dispersion compensation unit according to the present invention, at least one of the first optical fiber and second optical fiber preferably has a fatigue index of 15 or more in air. At least one of the first optical fiber and second optical fiber preferably has a hermetic coating to obtain a fatigue index of 50 or more. At least one of the first optical fiber and second optical fiber preferably has a carbon coating. In this case, even when the first optical fiber and second optical fiber are stored in the case and always have bending distortion, long-term reliability can be ensured. This structure can also appropriately be used to make the dispersion compensation unit compact because each of the first optical fiber and second optical fiber can be wound into a coil shape having a small diameter.

In the dispersion compensation unit according to the present invention, a transmission loss of the second optical fiber at the wavelength in use is preferably 0.175 dB/km or less. In this case, the insertion loss of the dispersion compensation unit is also small.

In the dispersion compensation unit according to the present invention, an effective area of the second optical fiber at the wavelength in use is preferably 75 $\mu$m$^2$ or more, and more preferably, 100 $\mu$m$^2$ or more. In this case, any nonlinear optical phenomenon in the dispersion compensation unit can be suppressed, and high-quality signal light can be transmitted.

In addition, the aforementioned effective area $A_{eff}$ is given by the following equation, as described in Japanese Patent Application Laid-Open No. 8-248251 (EP0724171A2).

$$A_{eff} = 2\pi \left( \int_0^\infty E^2 r\, dr \right)^2 \bigg/ \left( \int_0^\infty E^4 r\, dr \right)$$

In this equation, E represents the electric field caused by the propagating light and r the radial distance from the center of the core.

An optical communication system according to the present invention is characterized by comprising an optical fiber transmission line which transmits signal light, and the dispersion compensation unit according to the present invention, which is connected to the optical fiber transmission line. In this optical communication system, the signal light propagates through the optical fiber transmission line and the first optical fiber and second optical fiber in the dispersion compensation unit. The dispersion compensation unit can increase the ratio R. Hence, even when the optical fiber transmission line is constituted by a non-zero dispersion-shifted optical fiber, both the chromatic dispersion and dispersion slope of the optical fiber transmission line can be compensated for. Hence, in this optical communication system, the absolute value of the chromatic dispersion is small in a wide signal light wavelength band. For this reason, communication of a larger capacity is possible.

In the optical communication system according to the optical communication system, that in the dispersion compensation unit, the signal light preferably propagates through the first optical fiber after propagating through the second optical fiber. In this case, the signal light having a relatively high power propagates through the second optical fiber (having a relatively large effective area). The signal light whose power has decreased due to this propagation propagates through the first optical fiber (having a relatively small effective area). For this reason, any nonlinear optical phenomenon in the dispersion compensation unit can be suppressed, and the signal light transmission quality becomes high.

The optical communication system according to the present invention preferably further comprises pumping light supply means for supplying Raman amplification pumping light into the first optical fiber in order to Raman-amplify the signal light propagating through the first optical fiber. In this case, the signal light is Raman-amplified through the first optical fiber, the effective insertion loss of the dispersion compensation unit can be reduced.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a table that lists the specifications of examples of the dispersion compensation unit and the like.

DETAILED DESCRIPTION OF THE PREFERRED EMBODIMENTS

Figure 1:
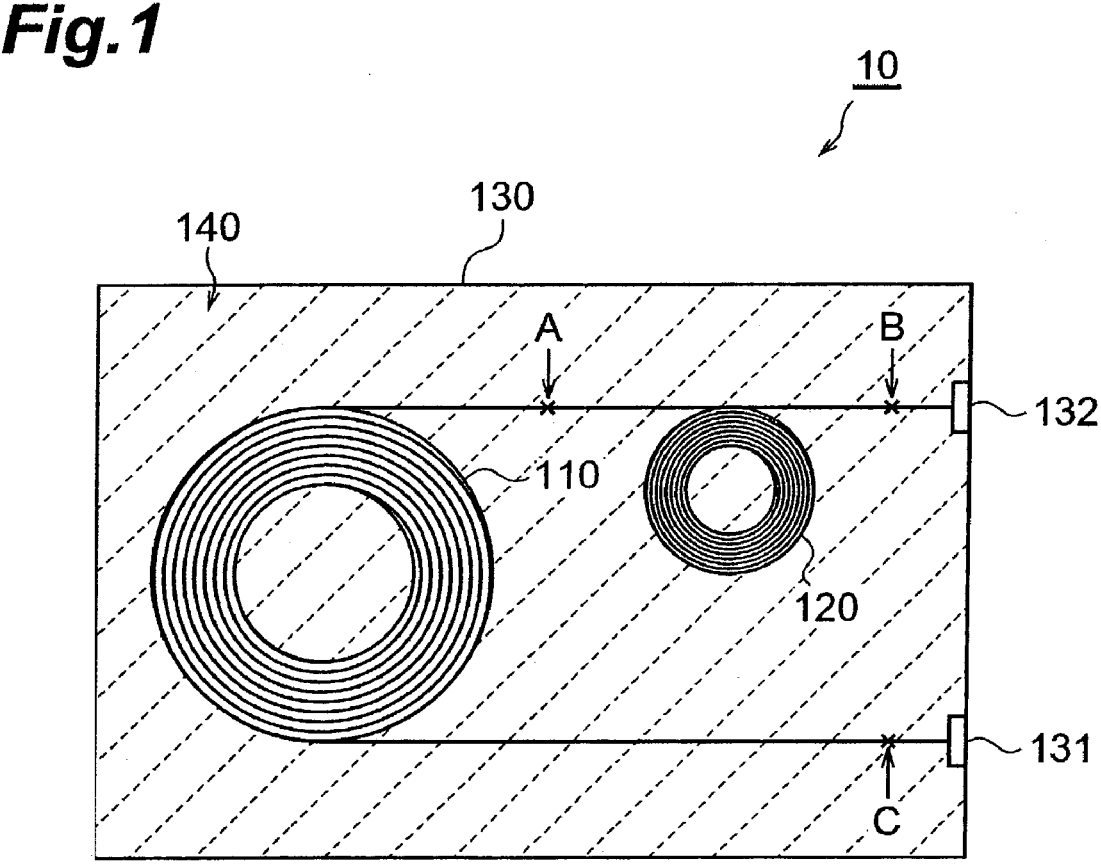
FIG. 1 is a view of an embodiment of the dispersion compensation unit according to the present invention.

The embodiments of the present invention will be described below in detail with reference to FIGS. 1–3, 4A–8B and 9–11. The same reference numerals denote the same elements throughout the drawings, and a repetitive description thereof will be omitted.

An embodiment of a dispersion compensation unit according to the present invention will be described first. FIG. 1 is a view of an embodiment of the dispersion compensation unit according to the present invention. The dispersion compensation unit 10 shown in FIG. 1 is formed by winding a first optical fiber 110 and second optical fiber 120 into coil shapes and storing them in a case 130. One end face of the first optical fiber 110 and one end face of the second optical fiber 120 are fusion-spliced at the fusion-spliced portion A. The other end face of the first optical fiber 110 is optically connected to an optical connector 131 provided on a wall surface of the case 130 at the fusion-spliced portion B. The other end face of the second optical fiber 120 is optically connected to an optical connector 132 provided on a wall surface of the case 130 at the fusion-spliced portion C. When the first optical fiber 110 and second optical fiber 120 are stored in one case 130, the dispersion compensation unit 10 can easily be handled.

The fusion-spliced loss at the fusion-spliced portion A between the first optical fiber 110 and the second optical fiber 120 is preferably 0.5 dB or less. The loss at the connection portion between the first optical fiber 110 and the optical connector 131 is also preferably 0.5 dB or less. The loss at the connection portion between the second optical fiber 120 and the optical connector 132 is also preferably 0.5 dB or less. In this case, the insertion loss of the dispersion compensation unit 10 becomes small, and the system margin in the entire optical communication system including the dispersion compensation unit 10 can be made large.

The space between the inner surface of the case 130 and both the first optical fiber 110 and second optical fiber 120 is preferably filled with a resin 140. In this case, any increase in micro-bending loss of each of the first optical fiber 110 and second optical fiber 120 can be suppressed. Additionally, the structure of the dispersion compensation unit 10 can be simplified. Alternatively, the space between the inner surface of the case 130 and only the first optical fiber 110 may be filled with a resin. In this case, any increase in micro-bending loss of the first optical fiber 110, in which the micro-bending loss relatively easily increases, can be suppressed.

Figure 2:
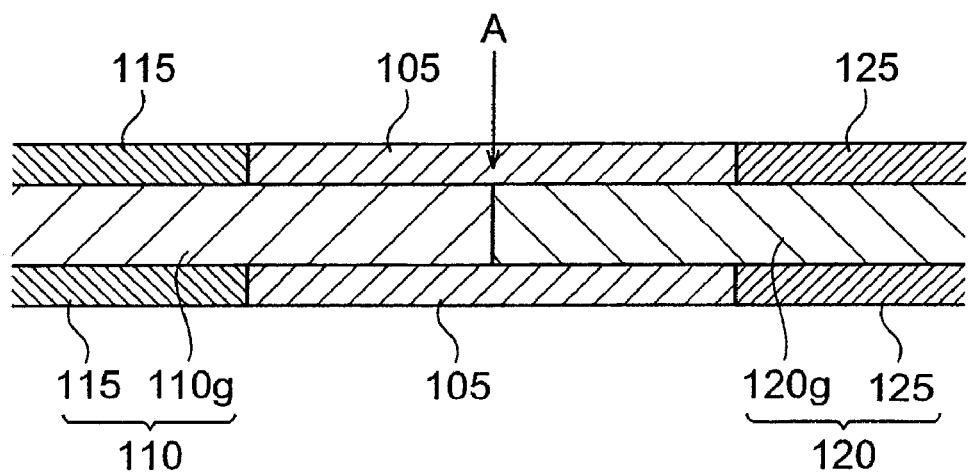
FIG. 2 is an explanatory view of the fusion-spliced potion between the first and second optical fibers in the dispersion compensation unit of FIG. 1.

FIG. 2 is a view showing the fusion-spliced portion A between the first optical fiber 110 and the second optical fiber 120 in the dispersion compensation unit 10 of FIG. 2. FIG. 2 shows a section including the optical axis of each optical fiber. In fusion-splicing, a coating 115 is removed near one end face of the first optical fiber 110 to expose a glass portion 110g. A coating 125 is removed near one end face of the second optical fiber 120 to expose a glass portion 120 g. Then, the end faces of the optical fibers are connected to each other by fusion-splicing. The fusion-spliced portion A at which the coatings 115 and 125 are removed is re-coated with a coating 105. The coating 105 preferably has the same outer diameter as that of the coatings 115 and 125 at the remaining portions. In this case, when the first optical fiber 110 and second optical fiber 120 are wound into coil shapes, the side pressure applied to a portion in contact with the fusion-spliced portion A is low, and the loss becomes small.

Figure 3:
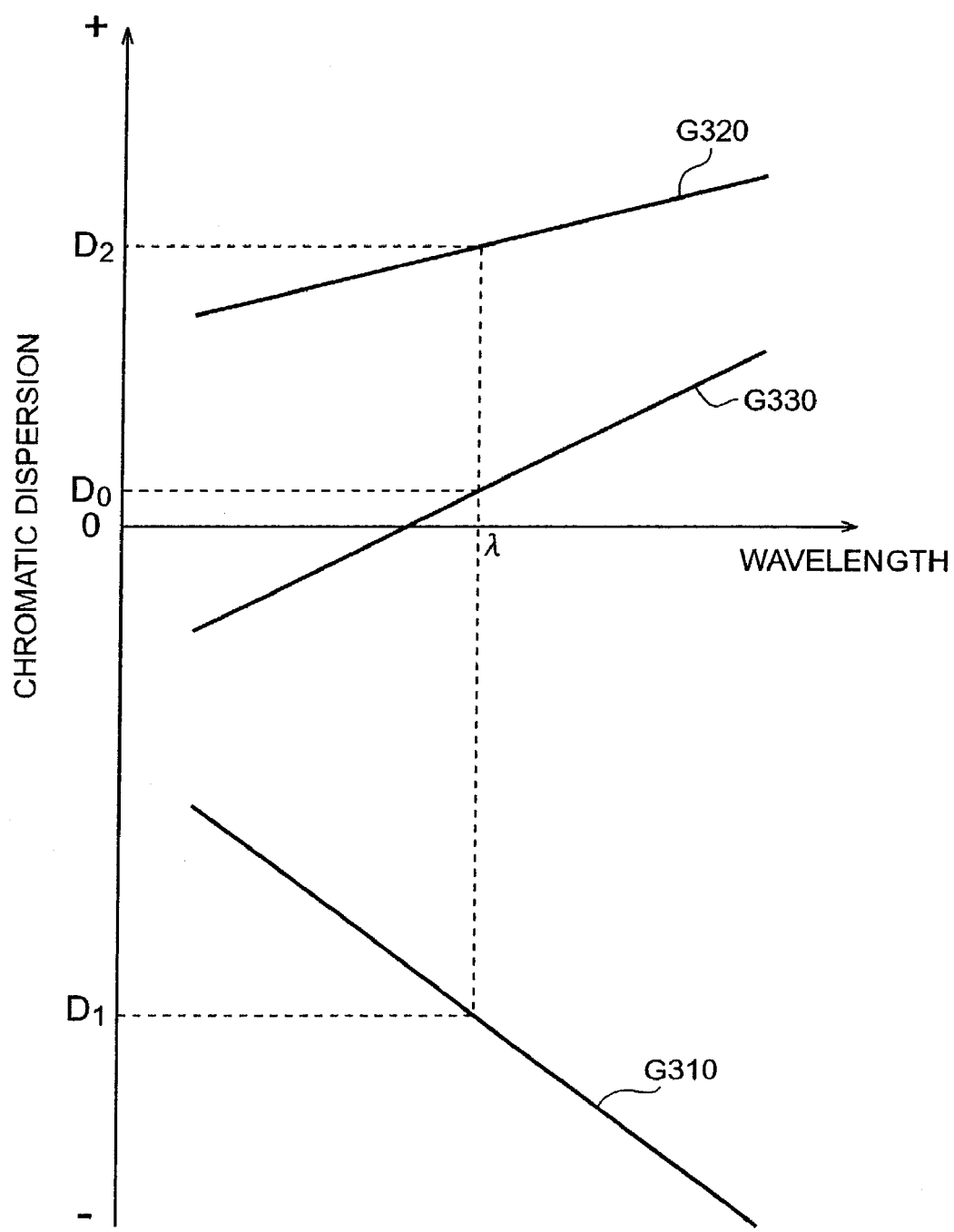
FIG. 3 is a graph showing the chromatic dispersion characteristics of the first and second optical fibers in the dispersion compensation unit of FIG. 1.

FIG. 3 is a graph showing the chromatic dispersion characteristics of the first optical fiber 110 and second optical fiber 120 in the dispersion compensation unit 10 of FIG. 1. In FIG. 1, the curve G310 indicates the chromatic dispersion characteristic of the first optical fiber 110, the curve G320 indicates the chromatic dispersion characteristic of the second optical fiber 120, and the curve G330 indicates the chromatic dispersion characteristic of the non-zero dispersion-shifted optical fiber to be compensated for by the dispersion compensation unit 10 according to the present invention. The first optical fiber 110 has a negative chromatic dispersion $D_1$ and a negative dispersion slope $S_1$ at a use wavelength λ. The second optical fiber 120 has a positive chromatic dispersion $D_2$ and a positive dispersion slope $S_2$ at the use wavelength λ. Note that the use wavelength λ is included in the C band (1,530 to 1,565 nm) and, e.g., 1,550 nm. The non-zero dispersion-shifted optical fiber has a small positive chromatic dispersion $D_0$ (several ps/nm/km) and a positive dispersion slope $S_0$ at the use wavelength λ.

Figure 4A:
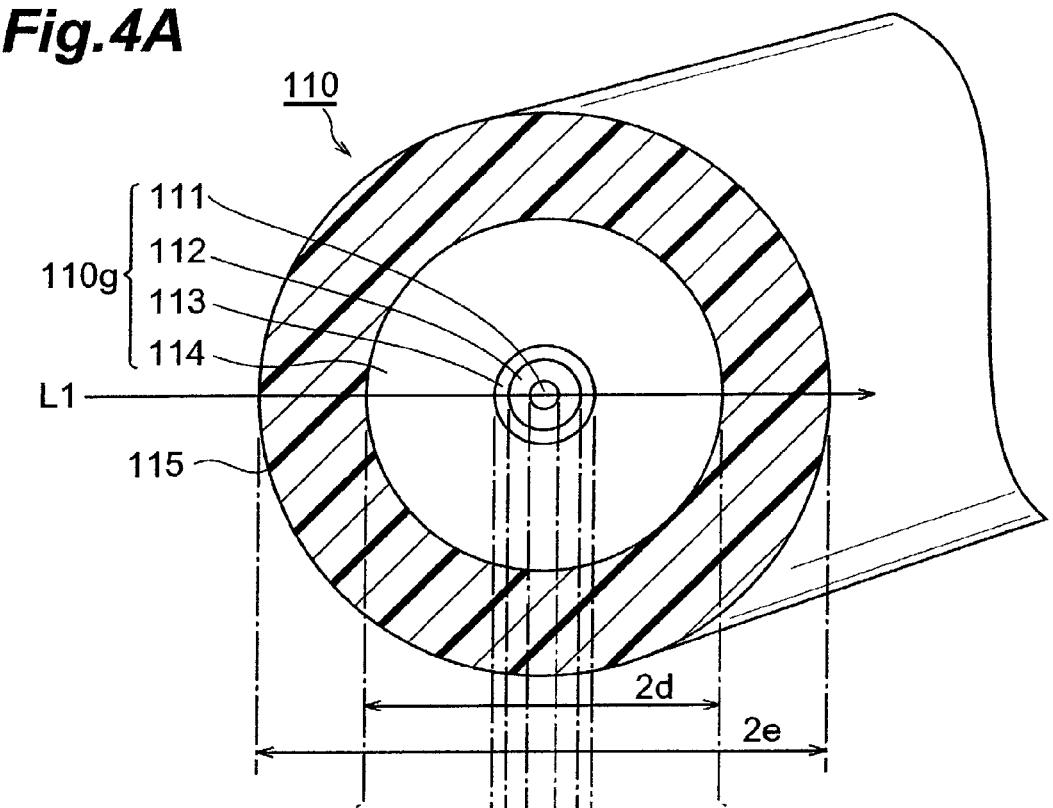
FIGS. 4A and 4B are views showing a configuration of the first optical fiber included in the dispersion compensation unit according to the present invention and a refractive index profile thereof.
Figure 4B:
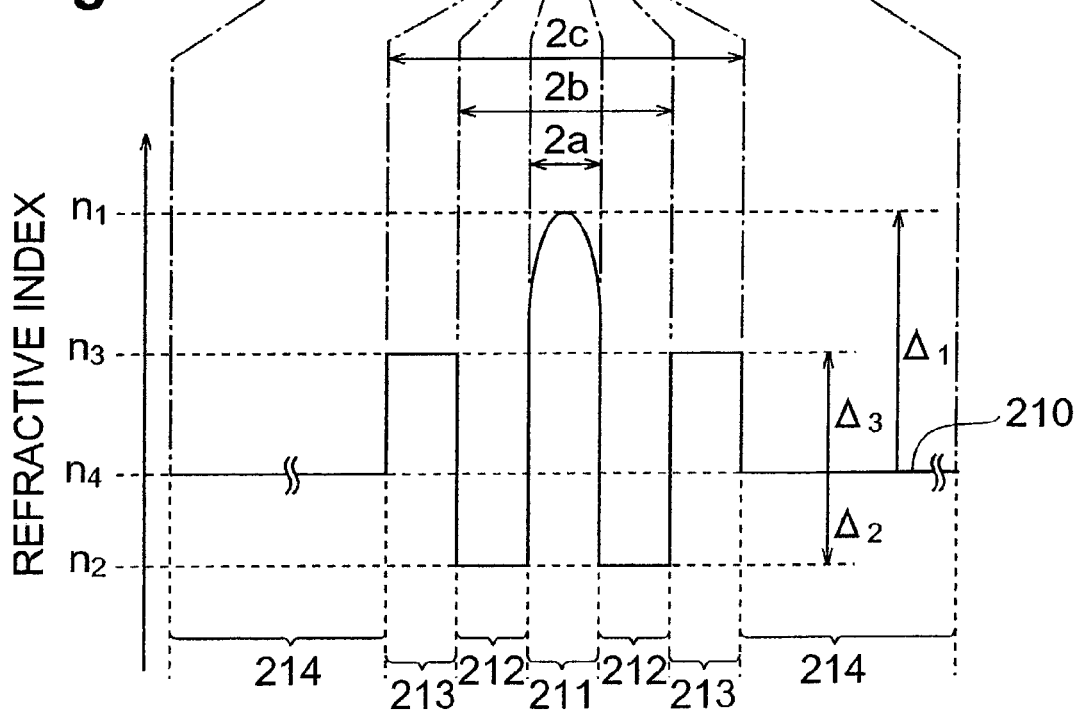

FIGS. 4A and 4B are views showing a configuration of the first optical fiber 110 included in the dispersion compensation unit 10 according to the present invention and a refractive index profile thereof. In particular, FIG. 4A shows a cross section perpendicular to the optical axis of the first optical fiber 110. FIG. 4B shows the index profile corresponding to positions on line L1 in the cross section of the first optical fiber 110. As shown in FIG. 4A, the first optical fiber 110 comprises a first core region 111, a second core region 112 provided on the outer periphery of the first core region 111, a third core region 113 provided on the outer periphery of the second core region 112, a cladding region 114 provided on the outer periphery of the third core region 113, and the resin coating 115 provided on the outer periphery of the cladding region 114. The first core region 111 has a maximum refractive index $n_1$ and an outer diameter $2a$. The second core region 112 has a refractive index $n_2$ ($<n_1$) and an outer diameter $2b$. The third core region 113 has a refractive index $n_1$ ($>n_2$, $<n_1$) and an outer diameter $2c$. The cladding region 114 has a refractive index $n_4$ ($<n_3$, $>n_2$) and an outer diameter $2d$. The coating 115 has an outer diameter $2e$. The glass portion 110g is constituted by the first core region 111, the second core region 112, the third core region 113 and the cladding region 114. The first optical fiber 110 having this index profile can be implemented using silica glass as a major component by, e.g., doping $GeO_2$ in appropriate amounts into the first core region 111 and third core region 113, respectively, and doping F element into the second core region 112. The first optical fiber 110 having this index profile can have characteristics described above or to be described later.

In the refractive index profile 210 of FIG. 4B, the region 211 corresponds to the refractive index of the first core region 111 along the line L1, the region 212 corresponds to the refractive index of the second core region 112 along the line L1, the region 213 corresponds to the refractive index of the third core region 113 along the line L1, and the region 214 corresponds to the refractive index of the cladding region 114 along the line L1. Additionally, with respect to the refractive index $n_4$ of the cladding region 114, the relative refractive index difference Δ1 of the first core region 111 is defined by the equation $((n_1-n_4)/n_4)$, the relative refractive index difference Δ2 of the second core region 112 is defined by the equation $((n_2-n_4)/n_4)$, and the relative refractive index difference Δ3 of the third core region 113 is defined by the equation $((n_3-n_4)/n_4)$.

Figure 5A:
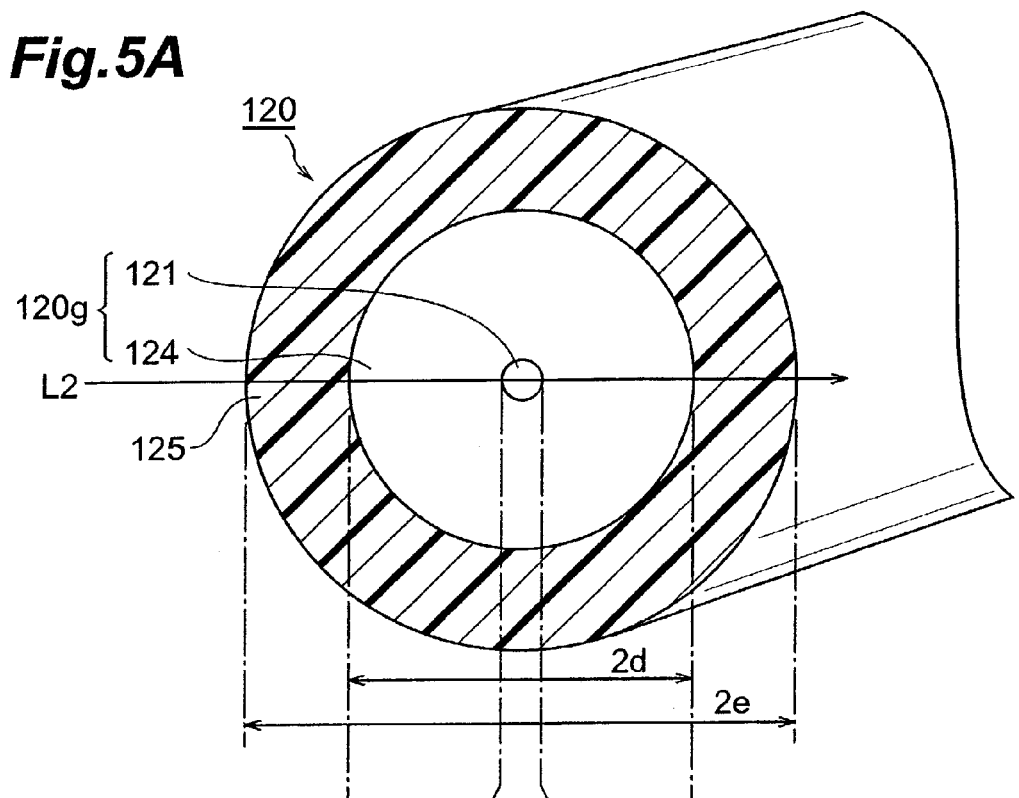
FIGS. 5A and 5B are views showing a configuration of the second optical fiber included in the dispersion compensation unit according to the present invention and a refractive index profile.
Figure 5B:
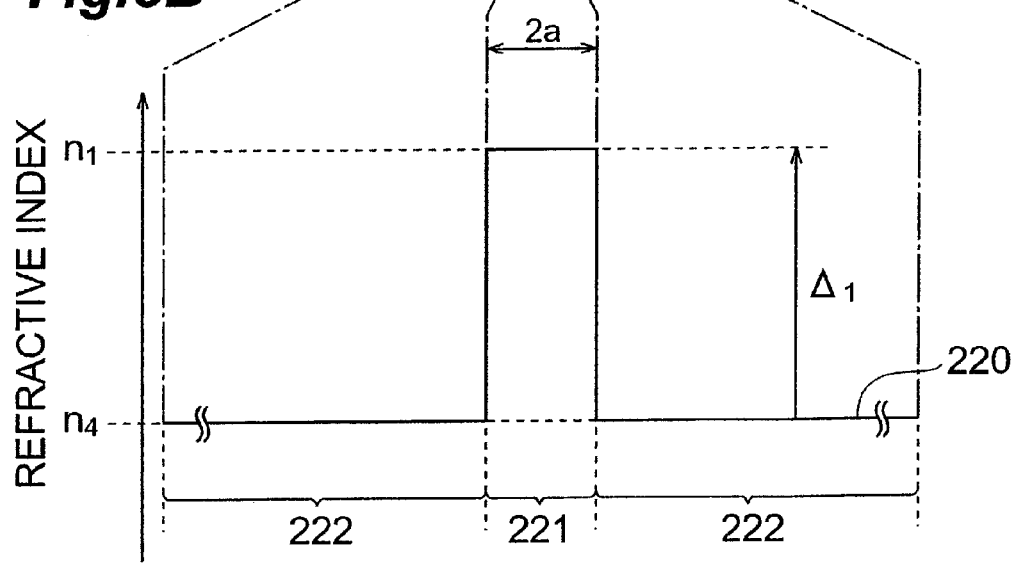

FIGS. 5A and 5B are views showing a configuration of the second optical fiber 120 included in the dispersion compensation unit 10 according to the present invention and a refractive index profile thereof. In particular, FIG. 5A shows a cross section perpendicular to the optical axis of the second optical fiber 120. FIG. 5B shows the index profile corresponding to positions on line L2 in the cross section of the second optical fiber 120. As shown in FIG. 5A, the second optical fiber 120 comprises a core region 121, a cladding region 124 provided on the outer periphery of the core region 121, and the resin coating 125 provided on the outer periphery of the cladding region 124. The core region 121 has a refractive index $n_1$ and an outer diameter $2a$. The cladding region 124 has a refractive index $n_4$ ($<n_1$) and an outer diameter $2d$. The coating 125 has an outer diameter $2e$. The glass portion 120g is constituted by the core region 121 and the cladding region 124. The second optical fiber 120 having this index profile can be implemented using silica glass as a major component by, e.g., doping $GeO_2$ in appropriate amounts into the core region 121. Alternatively, the second optical fiber 120 can be implemented by making the core region 121 of pure silica glass and the cladding region 124 of silica glass doped with Germanium element. The second optical fiber 120 having this index profile can have characteristics described above or to be described later.

In the refractive index profile 220 of FIG. 5B, the region 221 corresponds to the refractive index of the core region 121 along the line L2, and the region 222 corresponds to the refractive index of the cladding region 124 along the line L2. Additionally, with respect to the refractive index $n_4$ of the cladding region 114, the relative refractive index difference $\Delta 1$ of the core region 121 is defined by the equation $((n_1-n_4)/n_4)$.

Let $L_1$ be the length of the first optical fiber 110 and $L_2$ be the length of the second optical fiber 120. At this time, an average chromatic dispersion $D_{total}$ and dispersion slope $S_{total}$ of the entire dispersion compensation unit 10 are given by the following equations (1a) and (1b).

$$D_{total} = (D_1 L_1 + D_2 L_2)/(L_1 + L_2) \qquad (1a)$$

$$S_{total} = (S_1 L_1 + S_2 L_2)/(L_1 + L_2) \qquad (1b)$$

A ratio R of the dispersion slope $S_{total}$ to the chromatic dispersion $D_{total}$ of the entire dispersion compensation unit 10 is given by the following equation (2).

$$R = S_{total}/D_{total} = (S_1 L_1 + S_2 L_2)/(D_1 L_1 + D_2 L_2) \qquad (2)$$

As compared with a structure including only a dispersion compensation optical fiber, the value R of the dispersion compensation unit 10 constituted by connecting the first optical fiber 110 and second optical fiber 120 is large. Hence, this dispersion compensation unit 10 can appropriately be used to compensate for both the chromatic dispersion and dispersion slope of a non-zero dispersion-shifted optical fiber. When the ratio R is 0.005/nm or more, the dispersion compensation unit 10 can appropriately be used to compensate for both the chromatic dispersion and dispersion slope of a non-zero dispersion-shifted optical fiber. More preferably, the ratio R is 0.005/nm or more but 0.030/nm or less.

For the first optical fiber 110, preferably, the chromatic dispersion $D_1$ is −40 ps/nm/km or less, and the ratio $(S_1/D_1)$ of the dispersion slope $S_1$ to the chromatic dispersion $D_1$ is 0.005/nm or more. In this case, the first optical fiber 110 can be shortened, and the dispersion compensation unit 10 can be made compact. For the first optical fiber 110, more preferably, the chromatic dispersion $D_1$ is −150 ps/nm/km or more but −40 ps/nm/km or less, and the ratio $(S_1/D_1)$ is 0.005/nm or more but 0.020/nm or less. In this case, the first optical fiber 110 can be shortened. In addition, any increase in bending loss and polarization mode dispersion of the first optical fiber 110 can be suppressed.

For the second optical fiber 120, preferably, the chromatic dispersion $D_2$ is 15 ps/nm/Km or more but 25 ps/nm/km or less, and the ratio $(S_2/D_2)$ of the dispersion slope $S_2$ to the chromatic dispersion $D_2$ is 0.001/nm or more but 0.01/nm or less. In this case, the second optical fiber 120 can be shortened, and the dispersion compensation unit 10 can be made compact.

For the dispersion compensation unit 10, preferably, at the use wavelength, the chromatic dispersion $D_{total}$ is −100 ps/nm/km or more but 0 ps/nm/km or less, the dispersion slope $S_{total}$ is −0.2 ps/nm²/km or more but 0 ps/nm²/km or less, and the total FOM is 10 ps/nm/dB or more but 200 ps/nm/dB or less. In this case, the dispersion compensation unit 10 can compensate for the chromatic dispersion and dispersion slope of any kind of non-zero dispersion-shifted optical fiber. Note that the FOM is obtained by dividing the chromatic dispersion by the loss. For the dispersion compensation unit 10, the entire polarization mode dispersion at the use wavelength is preferably 0.5 ps or less. In this case, the dispersion compensation unit 10 can be used for high-speed communication at a bit rate of 40 Gbps.

The second optical fiber 120 can ensure reliability when the coating diameter 2e is 125 μm or more. When the coating diameter 2e is 250 μm or less, the storability in the case 130 is high. When the glass diameter 2d is 80 μm or more, the second optical fiber 120 can be satisfactorily connected to the first optical fiber 110 by fusion-splicing. When the glass diameter 2d is 150 μm or less, the storability in the case 130 is high.

The fatigue index of both or one of the first optical fiber 110 and second optical fiber 120 in air is preferably 15 or more. Both or one of the first optical fiber 110 and second optical fiber 120 preferably has a hermetic coating or a carbon coating such that the fatigue index becomes 50 or more. The thickness of the carbon coating layer is preferably about 20 to 100 nm. In this case, even when the first optical fiber 110 and second optical fiber 120 are stored in the case 130 and always have bending distortion, long-term reliability can be ensured. The first optical fiber 110 and second optical fiber 120 can also appropriately be used to make the dispersion compensation unit 10 compact because each optical fiber can be wound into a coil shape having a small diameter. Note that the fatigue index is experimentally obtained by static fatigue test.

For the second optical fiber 120, the transmission loss at the use wavelength is preferably 0.175 dB/km or less. In this case, the insertion loss of the dispersion compensation unit 10 is also small. Specifically, even in an optical communication system having a plurality of dispersion compensation units arranged on its signal optical transmission line, when the insertion loss of each dispersion compensation unit is small, the system margin of the entire optical communication system becomes large, and the degree of freedom in design can be increased.

For the second optical fiber 120, the effective area $A_{eff}$ at the use wavelength is preferably 75 μm² or more, and more preferably, 100 μm or more. In this case, any nonlinear optical phenomenon in the dispersion compensation unit 10 can be suppressed, and high-quality signal light can be transmitted. Specifically, when the effective area $A_{eff}$ is 100 μm or more, any nonlinear optical phenomenon in the dispersion compensation unit 10 is suppressed even when the dispersion compensation unit 10 is arranged immediately after an optical transmitter or optical amplifier so that high power signal light becomes incident on the dispersion compensation unit 10.

Figure 6A:
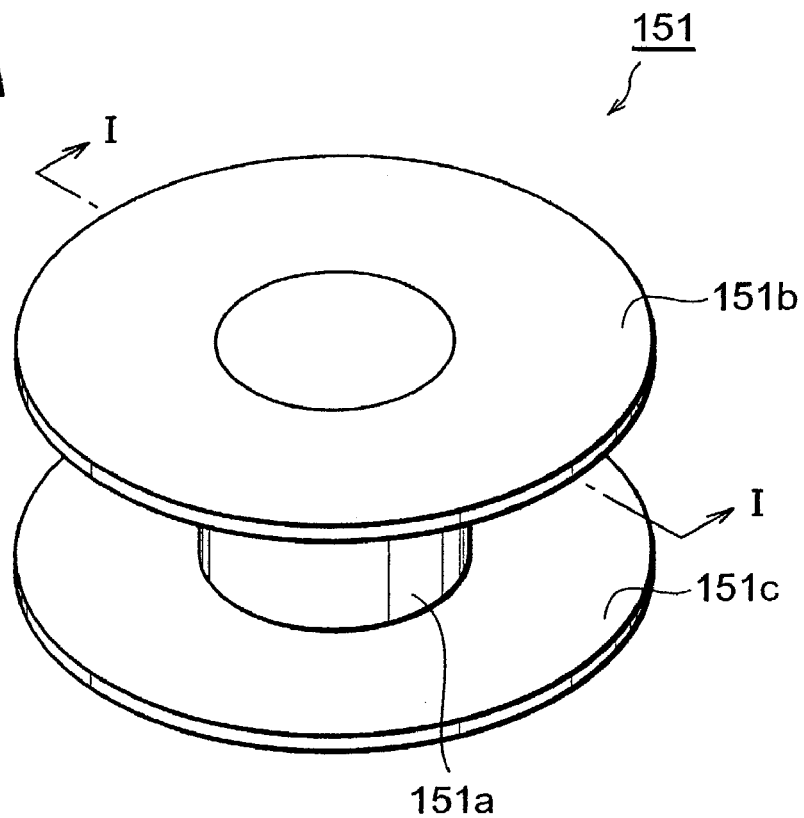
FIGS. 6A and 6B are views for explaining the first mounting structure of the first and second optical fibers in the dispersion compensation unit according to the present invention.
Figure 6B:
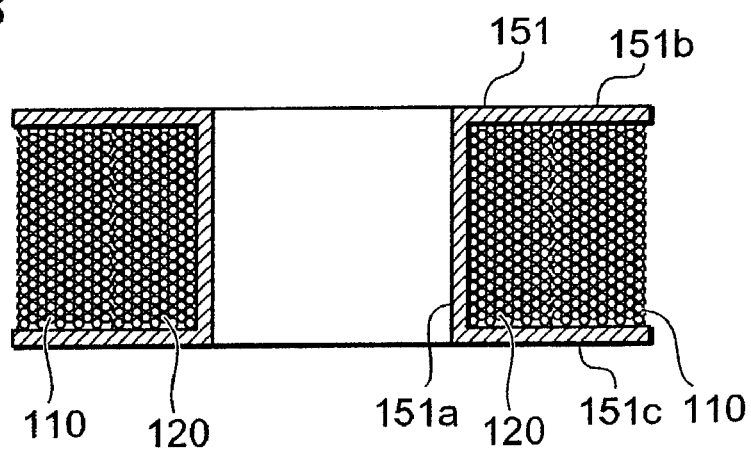

The mounting structure of the first and second optical fibers 110 and 120 in the dispersion compensation unit 10 shown in FIG. 1 will be described next. In particular, FIGS. 6A and 6B are views showing the first mounting structure of the first and second optical fibers 110 and 120 in the dispersion compensation unit 10 shown in FIG. 1. FIG. 6A is a perspective view of a bobbin 151 used for this mounting. FIG. 6B is a cross sectional view of the bobbin 151 along the line I—I shown in FIG. 1. The bobbin 151 shown in FIGS. 6A and 6B has flange portions 151b and 151c on both sides of a barrel portion 151a. The second optical fiber 120 is wound on the barrel portion 151a, and the first optical fiber 110 is wound on the second optical fiber 120. The first optical fiber 110 and second optical fiber 120 are preferably wound on one bobbin 151. In this case, since only one bobbin 151 suffices, it can easily be stored and handled, and the cost becomes low. In addition, when the first optical fiber 110 is wound outside the second optical fiber 120, the bending diameter of the first optical fiber 110 which is relatively poor in bendability can be increased. Hence, any increase in bending loss of the first optical fiber 110 can be suppressed, the insertion loss of the dispersion compensation unit 10 can be decreased, and the dispersion compensation unit 10 can be made compact. The first optical fiber 110 and second optical fiber 120 are preferably fixed with a resin. In this case, any increase in micro-bending loss of each of the first optical fiber 110 and second optical fiber 120 can be suppressed. The fusion-spliced portion is preferably fixed on the inner wall of the flange portion 151b or 151c. In this case, since the fusion-spliced portion is protected, and the influence of the fusion-spliced portion on the optical fibers 110 and 120 is reduced, the quality and reliability of the dispersion compensation unit 10 are ensured.

Figure 7A:
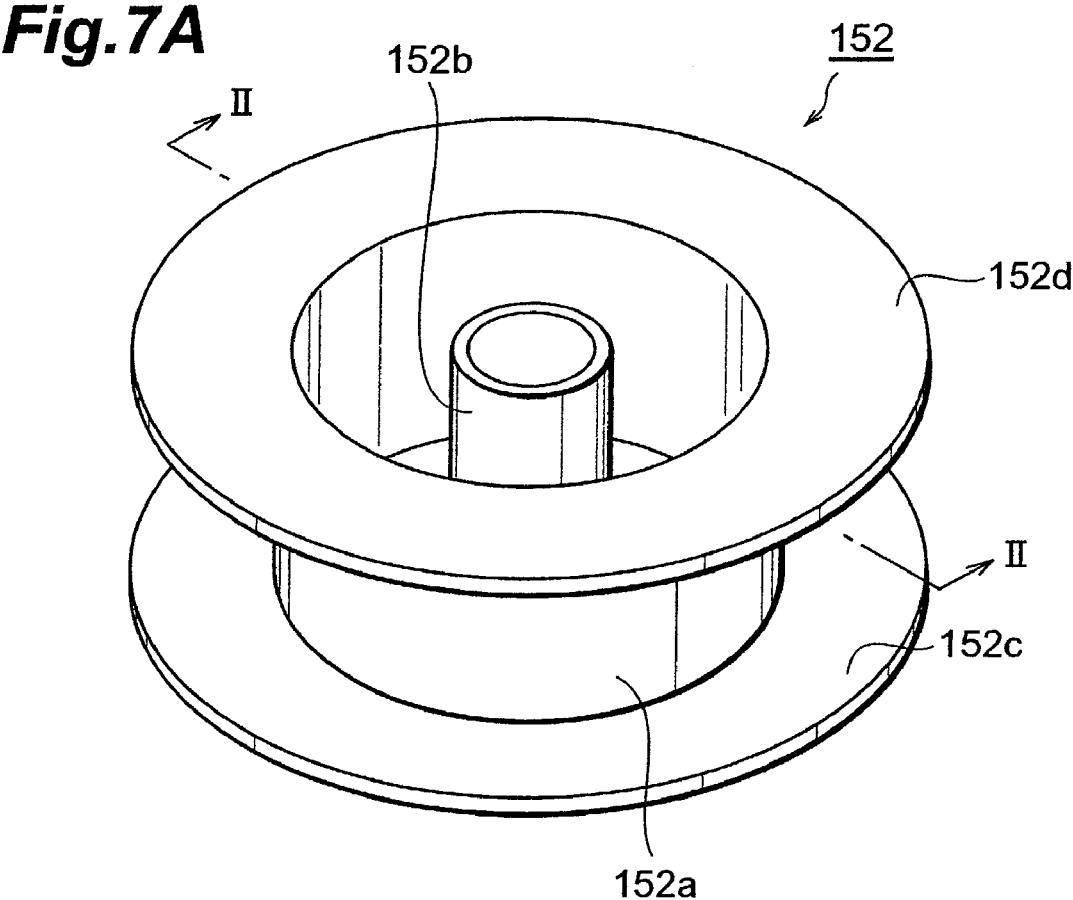
FIGS. 7A and 7B are views for explaining the second mounting structure of the first and second optical fibers in the dispersion compensation unit according to the present invention.
Figure 7B:
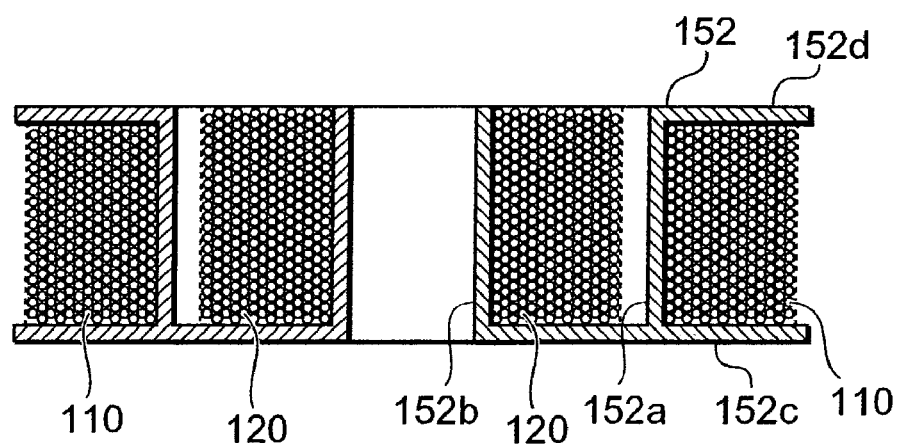

FIGS. 7A and 7B are views of the second mounting structure of the first and second optical fibers 110 and 120 in the dispersion compensation unit 10 shown in FIG. 1. In particular, FIG. 7A is a perspective view of a bobbin 152 used for this mounting. FIG. 7B is a cross sectional view of the bobbin 152 along the line II—II shown in FIG. 1. The bobbin 152 shown in FIGS. 7A and 7B has a rotational symmetrical shape about its central axis. The bobbin 152 has a cylindrical first barrel portion 152a, a cylindrical second barrel portion 152b formed inside the first barrel portion 152a, a bottom-surface-side flange portion 152c which radially extends from the second barrel portion 152b to the outside of the first barrel portion 152a, and an upper-surface-side flange portion 152d which radially extends from the first barrel portion 152a to the outside. The first optical fiber 110 is wound on the outer first barrel portion 152a, and the second optical fiber 120 is wound on the inner second barrel portion 152b. When the first optical fiber 110 is wound outside the second optical fiber 120, the bending diameter of the first optical fiber 110 which is relatively poor in bendability can be increased. Hence, any increase in bending loss of the first optical fiber 110 can be suppressed, the insertion loss of the dispersion compensation unit 10 can be decreased, and the dispersion compensation unit 10 can be made compact. The first optical fiber 110 and second optical fiber 120 are preferably fixed with a resin. In this case, any increase in micro-bending loss of each of the first optical fiber 110 and second optical fiber 120 can be suppressed.

Figure 8A:
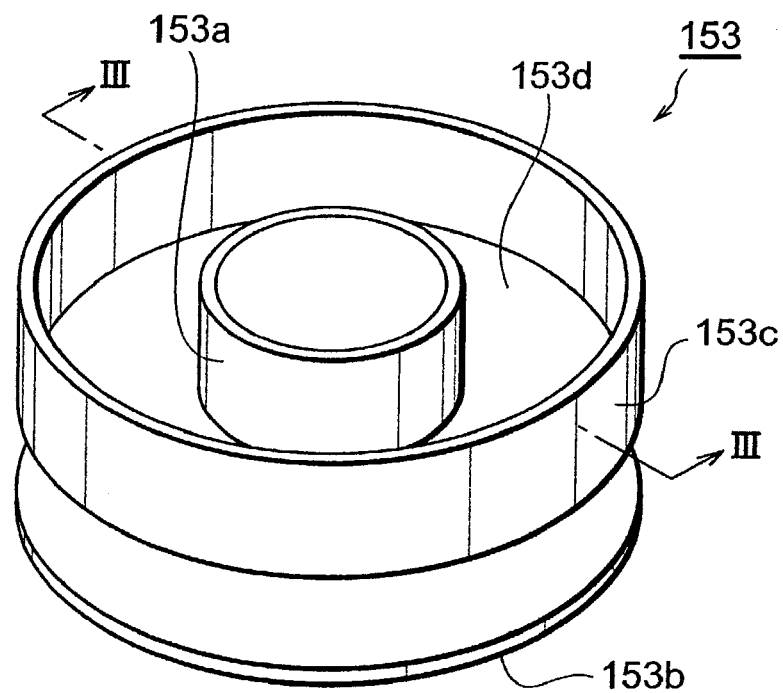
FIGS. 8A and 8B are views for explaining the third mounting structure of the first and second optical fibers in the dispersion compensation unit according to the present invention.
Figure 8B:
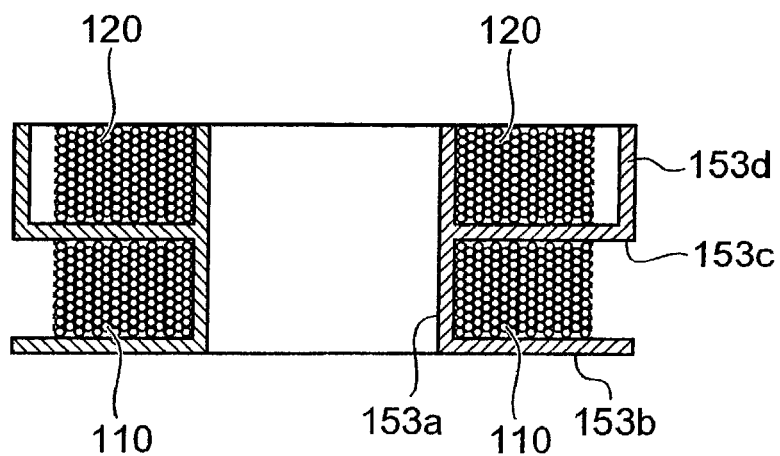

FIGS. 8A and 8B are views showing the third mounting structure of the first and second optical fibers 110 and 120 in the dispersion compensation unit 10 shown in FIG. 1. In particular, FIG. 8A is a perspective view of a bobbin 153 used for this mounting. FIG. 8B is a cross sectional view of the bobbin 153 along the line III—III shown in FIG. 1. The bobbin 153 shown in FIGS. 8A and 8B has a rotational symmetrical shape about its central axis. The bobbin 153 has a cylindrical barrel portion 153a, a first flange portion 153b formed on the bottom surface side of the barrel portion 153a, a second flange portion 153c formed near the center in the axial direction of the barrel portion 153a, and a wall portion 153d extending upward from the outer edge of the second flange portion 153c. The first optical fiber 110 is wound on the barrel portion 153a between the first flange portion 153b and the second flange portion 153c. The second optical fiber 120 is wound on the barrel portion 153a on the upper side of the second flange portion 153c. When the first optical fiber 110 and second optical fiber 120 which are wound into coil shapes are stacked in the axial direction, the bending diameter of the first optical fiber 110 which is relatively poor in bendability can almost equal that of the second optical fiber 120. Hence, any increase in bending loss of the first optical fiber 110 can be suppressed, and the insertion loss of the dispersion compensation unit 10 can be decreased. The first optical fiber 110 and second optical fiber 120 are preferably fixed with a resin. In this case, any increase in micro-bending loss of each of the first optical fiber 110 and second optical fiber 120 can be suppressed.

Figure 9:
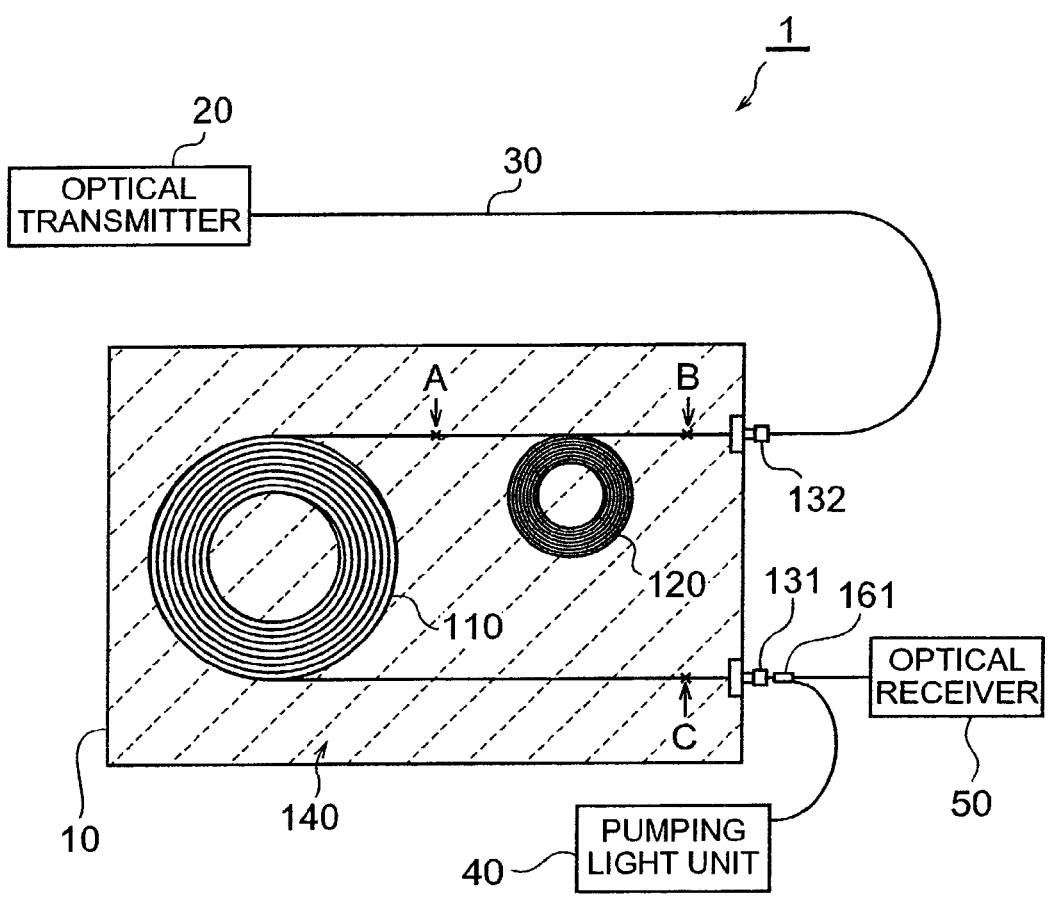
FIG. 9 is a view of an embodiment of the optical communication system according to the present invention.

An optical communication system including the dispersion compensation unit 10 according to the present invention will be described next. FIG. 9 is a view of an embodiment of the optical communication system according to the present invention. The optical communication system 1 shown in FIG. 9 has an optical transmitter 20, optical fiber transmission line 30, pumping light unit 40, and optical receiver 50 in addition to the above-mentioned dispersion compensation unit 10.

The optical transmitter 20 multiplexes signal light of a plurality of channels having different wavelengths in the C band and sends the signal light to the optical fiber transmission line 30. The optical fiber transmission line 30 is constituted from a non-zero dispersion-shifted optical fiber to be compensated for by the dispersion compensation unit 10 and transmits the signal light of the multiple-channels sent from the optical transmitter 20 to the dispersion compensation unit 10. The dispersion compensation unit 10 receives through the optical connector 132 the signal light that has propagated through the optical fiber transmission line 30, transmits the signal light through the second optical fiber 120 and first optical fiber 110 in this order, and outputs the signal light through the optical connector 131.

The pumping light unit 40 supplies Raman amplification pumping light into the dispersion compensation unit 10 through an optical coupler 161 arranged on the signal light output side of the optical connector 131. The optical coupler 161 outputs to the optical connector 131 the Raman amplification pumping light output from the pumping light unit 40, and outputs the signal light from the optical connector 131 to the optical receiver 50. The wavelength of the Raman amplification pumping light is shorter than the signal light wavelength by about 100 nm. The optical receiver 50 receives the signal light of multiple-channels that is output from the optical connector 131 of the dispersion compensation unit 10 through the optical coupler 161, demultiplexes the signal light of multiple-channels for each wavelength, and receives light of each signal channel.

The optical communication system 1 operates in the following way. The signal light of multiple-channels multiplexed and output from the optical transmitter 20 propagates through the optical fiber transmission line 30, sequentially propagates through the second optical fiber 120 and first optical fiber 110 in the dispersion compensation unit 10, and is received by the optical receiver 50 for each signal channel. The Raman amplification pumping light output from the pumping light unit 40 is supplied to the first optical fiber 110 through the optical coupler 161 and optical connector 131 and also supplied to the second optical fiber 120. Hence, the signal light whose power has attenuated through the optical fiber transmission line 30 is Raman-amplified through the first optical fiber 110 (and the second optical fiber 120) and reaches the optical receiver 50.

In this optical communication system 1, the signal light propagation line from the optical transmitter 20 to the optical receiver 50 is formed from a non-zero dispersion-shifted optical fiber that constructs the optical fiber transmission line 30, and the first optical fiber 110 and second optical fiber 120 included in the dispersion compensation unit 10. The dispersion compensation unit 10 has the above-mentioned characteristic and compensates for both the chromatic dispersion and dispersion slope of the optical fiber transmission line 30. Hence, in the signal light propagation line from the optical transmitter 20 to the optical receiver 50, the absolute value of the chromatic dispersion is small in a wide signal wavelength band. For this reason, communication of a larger capacity is possible.

In the dispersion compensation unit 10, signal light propagates through the second optical fiber 120 first, and then, through the first optical fiber 110. Generally, an optical fiber with a positive dispersion has a large effective area and can suppress any nonlinear optical phenomenon, as compared with an optical fiber having a negative dispersion. When the signal light thus propagates, the signal light having a relatively high power propagates through the second optical fiber 120. The signal light whose power has decreased due to this propagation propagates through the first optical fiber 110. For this reason, any nonlinear optical phenomenon in the dispersion compensation unit 10 can be suppressed, and the signal light transmission quality becomes high. In addition, the signal light is preferably Raman-amplified in the first optical fiber 110 using the fact that the first optical fiber 110 has a higher nonlinearity. In this case, the effective insertion loss of the dispersion compensation unit 10 can be reduced.

A detailed example of the dispersion compensation unit 10 and optical communication system 1 according to the present invention will be described next. FIG. 10 is a table that lists the specifications of examples of the dispersion compensation unit 10 and the like. FIG. 10 shows the length, chromatic dispersion D, dispersion slope S, ratio (S/D), loss, and FOM of each of the non-zero dispersion-shifted optical fiber to be compensated for, first optical fiber 110, second optical fiber 120, and dispersion compensation unit 10 at a wavelength of 1.55 μm.

For the non-zero dispersion-shifted optical fiber to be compensated for, the length is 100 km, the chromatic dispersion $D_0$ is 4 ps/nm/km, the dispersion slope $S_0$ is 0.08 ps/nm$^2$/km, the ratio ($S_0/D_0$) is 0.02/nm, and the loss is 0.21 dB/km. The dispersion compensation unit 10 compensates for the chromatic dispersion and dispersion slope of such a non-zero dispersion-shifted optical fiber. The specifications of the first optical fiber 110 and second optical fiber 120 are as follows.

For the first optical fiber 110, the length is 9.7 km, the chromatic dispersion $D_1$ is −80 ps/nm/km, the dispersion slope $S_1$ is −0.96 ps/nm$^2$/km, the ratio ($S_1/D_1$) is 0.012/nm, the loss is 0.35 dB/km, and the FOM is 229 ps/nm/dB. The first optical fiber 110 having such characteristics can be implemented by forming the index profile shown in FIG. 4B by setting the outer diameter 2a of the first core region 111 to 3.9 μm, the outer diameter 2b of the second core region 112 to 13 μm, the outer diameter 2c of the third core region 113 to 15 μm, a relative refractive index difference Δ1 of the first core region 111 with respect to the cladding region 114 to 1.6%, a relative refractive index difference Δ2 of the second core region 112 with respect to the cladding region 114 to −0.5%, and a relative refractive index difference Δ3 of the third core region 113 with respect to the cladding region 114 to 0.3%.

For the second optical fiber 120, the length is 21.9 km, the chromatic dispersion $D_2$ is 17 ps/nm/km, the dispersion slope $S_2$ is 0.058 ps/nm$^2$/km, the ratio ($S_2/D_2$) is 0.003/nm, the loss is 0.20 dB/km, and the FOM is −85 ps/nm/dB. The second optical fiber 120 having such characteristics can be implemented by forming the index profile shown in FIG. 5B by setting the outer diameter 2a of the core region 121 to 8 μm and the relative refractive index difference Δ1 of the core region 121 with respect to the cladding region 124 to 0.3%.

For the entire dispersion compensation unit 10 formed by connecting the first optical fiber 110 and second optical fiber 120, the chromatic dispersion $D_{total}$ is −13 ps/nm/km, the dispersion slope $S_{total}$ is −0.25 ps/nm$^2$/km, the ratio R is 0.020/nm, the loss is 0.27 dB/km, and the FOM is 47 ps/nm/dB. That is, the ratio R of the entire dispersion compensation unit 10 equals the ratio ($S_0/D_0$) of the non-zero dispersion-shifted optical fiber to be compensated for. Hence, the dispersion compensation unit 10 can compensate for both the chromatic dispersion and dispersion slope of the non-zero dispersion-shifted optical fiber.

Figure 11:
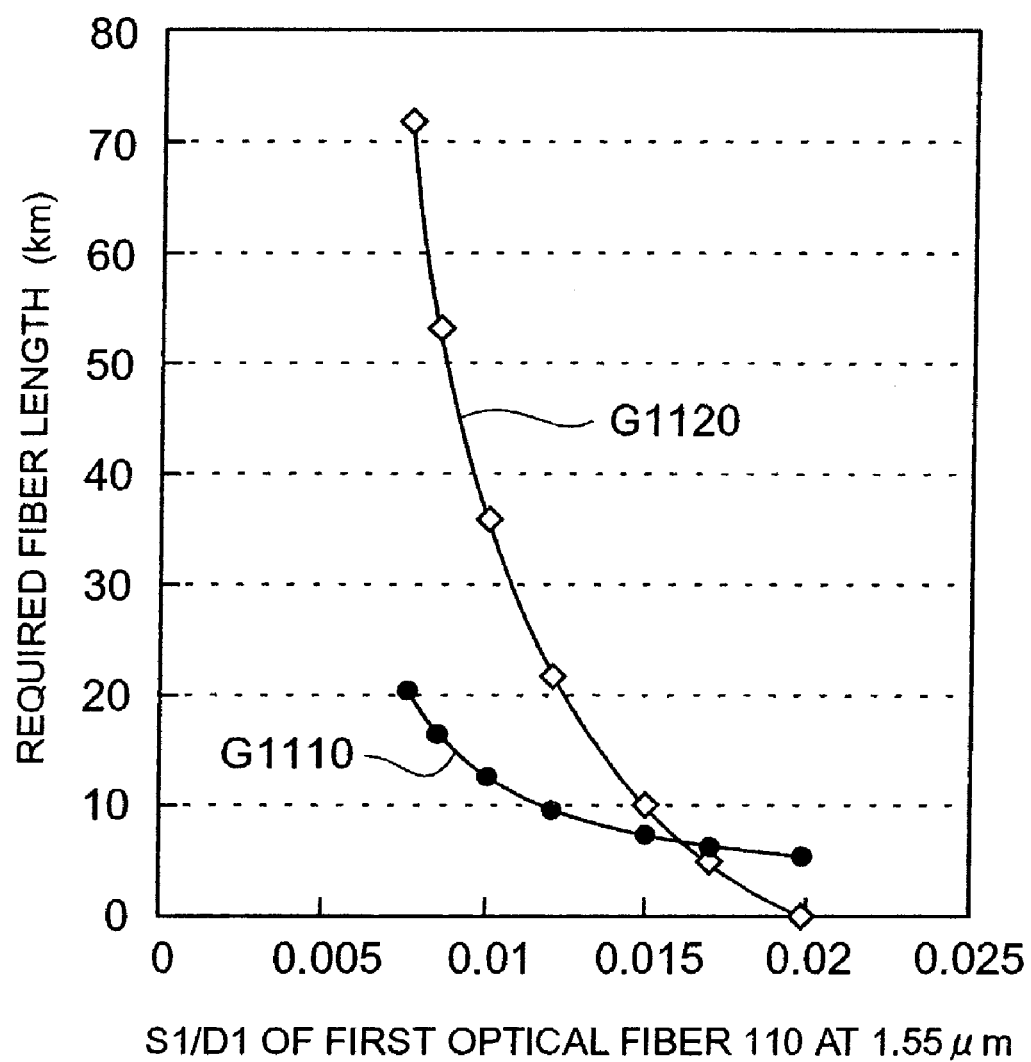
FIG. 11 is a graph showing the relationship between the ratio $(S_1/D_1)$ and the required fiber length of the first optical fiber.

FIG. 11 is a graph showing the relationship between the ratio ($S_1/D_1$) and the required fiber length of the first optical fiber 110. For the non-zero dispersion-shifted optical fiber to be compensated for, assume that the length is 100 km, the chromatic dispersion $D_0$ is 4 ps/nm/km, the dispersion slope $S_0$ is 0.08 ps/nm$^2$/km, and the ratio ($S_0/D_0$) is 0.02/nm. For each value of the ratio ($S_1/D_1$) of the first optical fiber 110, the lengths of the first optical fiber 110 and second optical fiber 120 necessary for completely compensating for both the chromatic dispersion and dispersion slope of the non-zero dispersion-shifted optical fiber were obtained. As is apparent from FIG. 11, when the value of the ratio ($S_1/D_1$) of the first optical fiber 110 increases, both the first optical fiber 110 and second optical fiber 120 can be short. It is preferable in making the dispersion compensation unit 10 compact.

As has been described above in detail, the dispersion compensation unit according to the present invention can increase the value of the ratio R and can therefore compensate for both the chromatic dispersion and dispersion slope of a non-zero dispersion-shifted optical fiber having whose value of the ratio (chromatic dispersion $S_0$/chromatic dispersion $D_0$) is large.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion compensation unit, comprising:
  a first optical fiber having a negative chromatic dispersion D1 and a negative dispersion slope $S_1$ at a wavelength in use;
  a second optical fiber connected to said first optical fiber, said second optical fiber having a positive chromatic dispersion $D_2$ and a positive dispersion slope $S_2$ at the wavelength in use; and
  a case accommodating both said first and second optical fibers
  wherein letting $L_1$ be a length of said first optical fiber and $L_2$ be a length of said second optical fiber, a ratio R of said entire compensating unit defined by "R=($S_1L_1$+$S_2L_2$)/($D_1L_1$+$D_2L_2$)" is set to be greater than a ratio ($S_1/D_1$) of the dispersion slope $S_1$ to the chromatic dispersion $D_1$ of said first optical fiber.

2. A dispersion compensation unit according to claim 1, wherein the chromatic dispersion $D_1$ of said first optical fiber is −40 ps/nm/km or less, and the ratio ($S_1/D_1$) of said first optical fiber is 0.005/nm or more.

3. A dispersion compensation unit according to claim 1, wherein the chromatic dispersion $D_1$ of said first optical fiber is −150 ps/nm/km or more, and the ratio ($S_1/D_1$) of said first optical fiber is 0.020/nm or less.

4. A dispersion compensation unit according to claim 1, wherein the chromatic dispersion $D_2$ of said second optical fiber is 15 ps/nm/km or more but 25 ps/nm/km or less, and a ratio ($S_2/D_2$) of the dispersion slope $S_2$ to the chromatic dispersion $D_2$ of said second optical fiber is 0.001/nm or more but 0.01/nm or less.

5. A dispersion compensation unit according to claim 1, wherein the ratio R is 0.005/nm or more.

6. A dispersion compensation unit according to claim 5, wherein the ratio R is 0.005/nm or more but 0.030/nm or less.

7. A dispersion compensation unit according to claim 1, wherein said first optical fiber and second optical fiber are wound into coil shapes and stored in said case.

8. A dispersion compensation unit according to claim 7, wherein, of said first optical fiber and second optical fiber, a space between an inner surface of said case and only said first optical fiber is filled with a resin.

9. A dispersion compensation unit according to claim 7, wherein a space between an inner surface of said case and both of said first optical fiber and second optical fiber is filled with a resin.

10. A dispersion compensation unit according to claim 1, wherein said first optical fiber and second optical fiber are fusion-spliced to each other.

11. A dispersion compensation unit according to claim 10, wherein a fusion-spliced loss between said first and second optical fibers is 0.5 dB or less.

12. A dispersion compensation unit according to claim 10, wherein a fusion-spliced portion is re-coated with a resin, and a re-coating diameter equals that of a remaining coating portion.

13. A dispersion compensation unit according to claim 10, wherein said first optical fiber and second optical fiber are wound on one bobbin.

14. A dispersion compensation unit according to claim 13, wherein a fusion-spliced portion is fixed to a flange portion of said bobbin.

15. A dispersion compensation unit according to claim 1, wherein said first optical fiber is wound into a coil shape outside said second optical fiber wound into a coil shape.

16. A dispersion compensation unit according to claim 1, wherein said first optical fiber and second optical fiber which are wound into coil shapes are stacked along an axial direction.

17. A dispersion compensation unit according to claim 1, wherein, at the wavelength in use, an entire chromatic dispersion is −100 ps/mm/km or more but 0 ps/nm/km or less, an entire dispersion slope is −2.0 ps/nm$^2$/km or more but 0 ps/nm$^2$/km or less, an entire FOM (=absolute value of chromatic dispersion/insertion loss) is 10 ps/nm/dB or more but 200 ps/nm/dB or less.

18. A dispersion compensation unit according to claim 1, wherein, at the wavelength in use, an entire polarization mode dispersion is 0.5 ps or less.

19. A dispersion compensation unit according to claim 1, wherein said second optical fiber has a coating with an outer diameter of 125 μm or more but 250 μm or less.

20. A dispersion compensation unit according to claim 1, wherein a most outer diameter of a glass portion of said second optical fiber is 80 μm or more but 150 μm or less.

21. A dispersion compensation unit according to claim 1, wherein, at least one of said first optical fiber and second optical fiber has a fatigue index of 15 or more in air.

22. A dispersion compensation unit according to claim 1, wherein, at least one of said first optical fiber and second optical fiber has a hermetic coating to obtain a fatigue index of 50 or more.

23. A dispersion compensation unit according to claim 22, wherein, at least one of said first optical fiber and second optical fiber has a carbon coating.

24. A dispersion compensation unit according to claim 1, wherein a transmission loss of said second optical fiber at the wavelength in use is 0.175 dB/km or less.

25. A dispersion compensation unit according to claim 1, wherein an effective area of said second optical fiber at the wavelength in use is 75 μm$^2$ or more.

26. A dispersion compensation unit according to claim 1, wherein an effective area of said second optical fiber at the wavelength in use is 100 μm$^2$ or more.

27. An optical communication system, comprising:
an optical fiber transmission line which transmits signal light; and
a dispersion compensation unit according to claim 1, which is connected to said optical fiber transmission line.

28. An optical communication system according to claim 27, wherein, in said dispersion compensation unit, the signal light propagates through said first optical fiber after propagating through said second optical fiber.

29. An optical communication system according to claim 27, further comprising pumping light supply means for supplying Raman amplification pumping light into said first optical fiber in order to Raman-amplify the signal light propagating through said first optical fiber.

* * * * *